No. 661,507. Patented Nov. 13, 1900.
H. FLANDERS.
CAN OPENER.
(Application filed July 27, 1899.)
(No Model.)
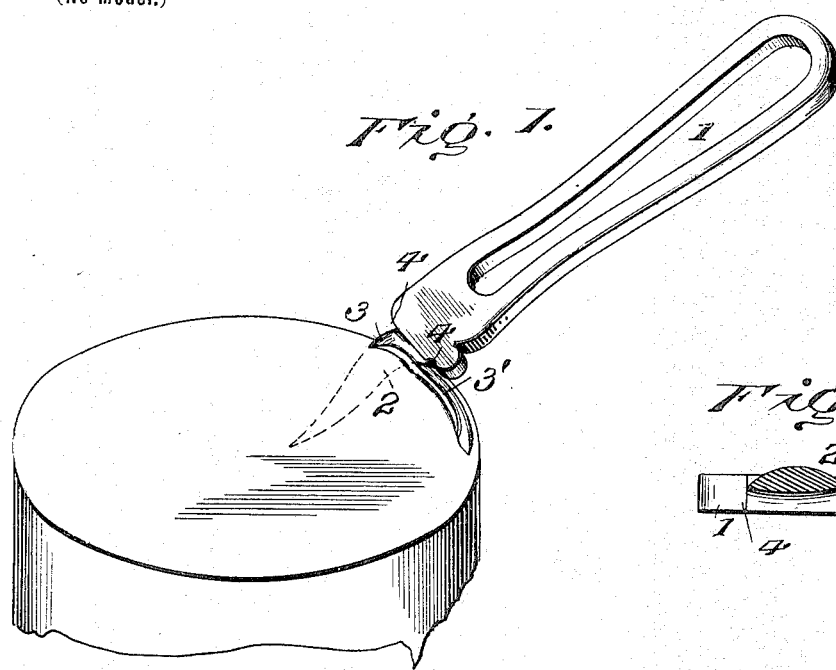
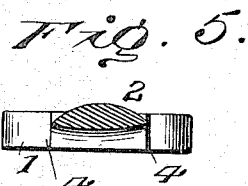
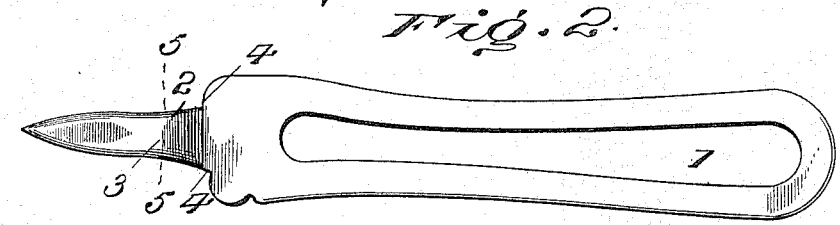
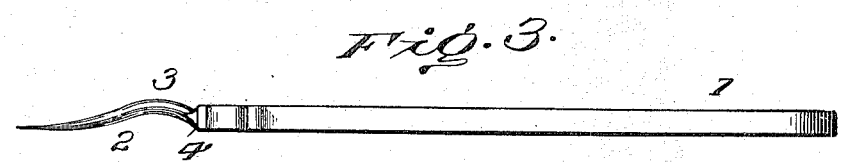
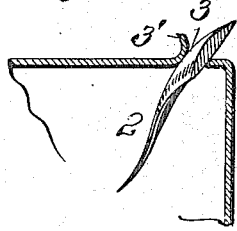
Witnesses
Inventor
Herbert Flanders
by Benj. R. Catlin
Attorney
THE NORRIS PETERS CO., PHOTO-LITHO., WASHINGTON, D. C.

UNITED STATES PATENT OFFICE.

HERBERT FLANDERS, OF MANCHESTER, NEW HAMPSHIRE, ASSIGNOR OF ONE-HALF TO JOHN FOSTER, OF SAME PLACE.

CAN-OPENER.

SPECIFICATION forming part of Letters Patent No. 661,507, dated November 13, 1900.

Application filed July 27, 1899. Serial No. 725,258. (No model.)

*To all whom it may concern:*

Be it known that I, HERBERT FLANDERS, a resident of Manchester, in the county of Hillsborough and State of New Hampshire, have invented certain new and useful Improvements in Can-Openers; and I do hereby declare the following to be a full, clear, and exact description of the invention, such as will enable others skilled in the art to which it pertains to make and use the same.

The invention relates to so-called "can-openers," and has for its object to increase their efficiency.

In the use of prior can-openers the edges of the tin that is being cut hug the blade and obstruct its forward movement.

My improvement comprises a blade having a longitudinally-curved portion adjacent the handle, said portion having a transversely-convex surface to roll the cut edge of the can-top and having also a cutting edge adjacent the handle to bite the can-flange in operation and preferably having such a cutting edge on both sides to permit either a right or left hand use, the handle by preference being provided on each side with a shoulder to bear against the side of the can. The shoulder is, however, not essential for the reason that the curved part of the knife adjacent the handle has a cutting edge that can in operation be made to cut into a can-flange with the effect to hold the knife from slipping while manipulating it to cut the can-top.

The invention consists in the construction herein described and pointed out.

In the accompanying drawings, Figure 1 is a perspective of the improved opener in operation. Fig. 2 is a plan of the opener. Fig. 3 is an edge elevation. Fig. 4 is a section showing the blade in operation. Fig. 5 is a section on line 5 5 of Fig. 2.

Numeral 1 denotes the handle, and 2 the blade, of the improved can-opener, which can be made of any usual or suitable metal, the blade and handle being preferably integral. The blade is made with a sharp point, as customary, and is approximately of the contour shown, being widest at its base. This form is incidental to the curved and convex form of the handle end of the blade and is not otherwise essential. The forward end of the blade by preference is situated in the same plane as the handle. The rear portion of the body of the blade is curved out of this plane, as indicated at 3, providing a convex portion of the body of the blade for a purpose to be explained. This curve is transverse to said plane, which passes through the handle and forward end of the blade and has an extent about equal to half the length of the blade. Both edges of the blade are cutting edges, so that it can be used with either the right or the left hand.

The handle has or may have its end wider than the blade to provide shoulders 4, one of which in operation may bear against the side of a can, while some part of the edge of the curved portion of the blade engages the edge of the can-top near its periphery. An important office of the shoulder is to arrest the blade in case it slips through the metal in entering its point, and thus prevent accidental injury to the hand.

The effect of the convexity 3 of the blade is to roll the cut edge of the can-top toward its center and out of the path of the blade (see 3', Fig. 4) when it is thrust forward subsequent to a cutting stroke to prepare for another, the stroke being effected by bearing down on the handle and using the can edge as a fulcrum, as usual in this class of can-openers. In such operation the sharp edge of the curved portion of the blade bearing on and cutting into the can edge will obviate slipping.

The cutting is effected by the upper edge of the blade and by that part of it which is adjacent to or joins the curved and straight portions. The effect of the convexity 3, formed and situated as set forth and best shown in Figs. 1 and 4, is to turn the edge of the tin on the inside of the blade in a manner somewhat resembling the action of a plow.

Having thus described my invention, I claim—

1. A can-opener having a handle, a blade projecting therefrom having a longitudinally-curved and transversely-convex portion next the handle, said curved transversely-convex part having a cutting edge adapted to bear on the edge of the can as a fulcrum.

2. A can-opener having a handle, a blade projecting therefrom having a longitudinally-curved and transversely-convex portion next the handle, said curved transversely-convex part having a cutting edge and the handle having a shoulder adjacent said edge as and for the purposes stated.

In testimony whereof I have signed this specification in the presence of two subscribing witnesses.

HERBERT FLANDERS.

Witnesses:
CHARLES J. HADLEY,
A. A. MARTIN.